3,261,887
TRANSPARENT GUM PLASTIC COMPOSITION CONTAINING METHYL METHACRYLATE RESIN AND GRAFT COPOLYMER
James U. Mann, Hopatcong, N.J., assignor to United States Rubber Company, New York, N.Y., a corporation of New Jersey
No Drawing. Filed Feb. 14, 1958, Ser. No. 715,208
18 Claims. (Cl. 260—876)

This invention relates to a plastic mixture, of the kind sometimes referred to as a "gum plastic," comprising polymethyl methacrylate or a copolymer of styrene and methyl methacrylate, mixed with a graft copolymer made by the emulsion polymerization of methyl methacrylate, styrene, or a mixture of methyl methacrylate and styrene in a latex of polybutadiene or of a rubbery copolymer of butadiene with a mono-olefin. The mixtures of the invention show the high impact resistance, modulus, and hardness which characterize a good gum plastic, and in addition have a high degree of transparency, which makes them particularly novel and valuable.

It has previously been known to make "gum plastics" based on mixtures of certain graft copolymers and certain resins. Thus, British Patent 749,494, issued May 23, 1956, to Union Carbide and Carbon Company, discloses mixtures of polystyrene with graft copolymers made by polymerizing styrene in the presence of a rubbery copolymer of styrene and butadiene. U.S. Patent 2,754,282, issued July 10, 1956, to Stoops and Price, discloses a graft copolymer of styrene on polybutadiene. U.S. Patent 2,755,270, issued July 17, 1956, to Hayes, discloses a type of three-component mixture comprising a resinous styrene homopolymer or copolymer, a graft of styrene on a butadiene-styrene rubber, and a butadiene rubber. Unfortunately all such prior art mixtures of which I have knowledge have suffered from the disadvantage that they are opaque, and so are unsuited for applications where transparency to light is necessary or desirable.

The present invention is based on the discovery that transparent gum plastics (by which is meant gum plastics which transmit at least 50% and preferably at least 65% of the incident light about 7000 Angstrom units wavelength through a layer $\frac{1}{16}$ inch thick) are obtained when a transparent resin, selected from the group consisting of poly-methyl methacrylate and copolymers of methyl methacrylate and styrene containing at least 40% (the percentages of all ingredients being expressed herein by weight) of polymerized methyl methacrylate, is mixed with a transparent graft copolymer, made by the emulsion polymerization of one of the monomers methyl methacrylate and styrene, or a mixture of these monomers, in a latex of polybutadiene, or of a rubbery copolymer of butadiene with a mono-olefin containing at least 60% of butadiene.

Preparation of the gum plastic mixtures of the invention involves four steps, which are described and exemplified as follows:

I. PREPARATION OF RUBBER LATEX

The rubber or elastomer (designated "E" for brevity and convenience) on which the graft polymer is formed, is prepared in latex form by emulsion polymerization. For purposes of the invention the rubber "E" may be polybutadiene or a copolymer of butadiene and a minor proportion (40% or less) of an olefin copolymerizable therewith to give a rubbery product. Examples of such olefins are styrene and the substituted styrenes such as alpha-methyl-styrene, the nuclear chloro-substituted styrenes, and the vinyltoluenes; methyl methacrylate, ethyl acrylate, and other alkyl esters of acrylic and methacrylic acids; acrylonitrile; and the dialkyl esters of maleic and fumaric acids, such as dimethyl maleate and diethyl fumarate.

In formulating the compound for the rubber "E," the use of opaque solid materials should be avoided as far as possible, since they will cause opacity in the gum plastic. Emulsifiers, catalysts, catalyst activators, and regulators, in the amounts customarily used, have a negligible effect on transparency. It is preferable to limit the amount of emulsifier to 7 parts or less per 100 of monomer, since the presence of excess emulsifier in the subsequent graft polymerization results in the formation of new latex particles, and thereby lowers the efficiency of the grafting process. The polymerization should preferably be carried to 85–100% conversion of the monomers to copolymer. With the above qualifications, any of the many well-known formulae for making synthetic rubbers by emulsion polymerization may be used. An example of a formula which may be used for the preparation of the rubber is as follows:

FORMULA A

| | |
|---|---|
| Monomers | 100 |
| Soap | 5 |
| Potassium hydroxide | 0.25 |
| Potassium persulfate | 0.5 |
| Mixed tertiary ($C_{12}$, $C_{14}$ and $C_{16}$ alkyl) mercaptans (MTM–4) | 0.05 |
| Water | 180 |

Polymerization time 3–40 hours at 50° C., as required to give 85–100% conversion.

The invention is not limited to rubbers prepared by this formula; many other formulas well known in the art may be used to prepare rubber latices suitable for use in the invention.

II. PREPARATION OF GRAFT COPOLYMER

The graft copolymer employed in the invention is prepared by emulsion polymerization in accordance with the known technique of "grafting" a resin onto a rubber, by emulsion polymerizing the resin-forming monomers in a latex of the previously prepared rubber. It is believed that by such a technique a substantial proportion of the resins forms as an actual part of the previously formed rubber molecule, so that the rubber and resin are, in effect, chemically united. This belief is based on the fact that, upon extracting the product of the graft polymerization with a solvent which dissolves the resin, but does not dissolve the rubber, a portion of the resinous component is found to be inseparable from the rubber. Whatever the theory or explanation, the fact is that such a graft copolymer gives quite different results in gum plastic mixtures from those obtained with a physical mixture of the separately prepared rubber and resin, or with a simple interpolymer of all of the monomers together.

For convenience and brevity the graft copolymer will herein be referred to by the letter "G," and the monomer component which is polymerized in the rubber latex will be designated "M." Thus "G" is the product of polymerizing "M" in a latex of the rubber "E."

The monomer component "M" may be methyl methacrylate (hereinafter designated MMA), styrene (designated S), or a mixture of MMA with S. Preferably "M" contains 25% or more of MMA, since graft copolymers made with a monomer component consisting of 75% or more of styrene frequently, although not invariably, cause opacity or greatly reduced transparency in the gum plastic mixes made from them.

The amount of "M" used is not critical; it may range from 10 to 200 parts of "M" per 100 parts or rubber, that is, the ratio of "M" to "E" may range from 0.1:1 to 2:1 by weight. Preferably between 25 and 100 parts of "M" per hundred of rubber are used. Grafts of less than 25 parts of monomer per 100 of rubber sometimes result in opaque gum plastic mixtures with low impact strength, probably because insufficient resinous material is actually attached to the rubber. Excessive proportions of "M" in the graft also result in inferior gum plastic properties, probably because the rubber is too extensively altered by actually attaching large amounts of resinous material to it. It should be understood that the limitations on the proportion of "M" used in making the graft copolymer will depend on a number of factors, among which are the efficiency of grafting (which will vary with the particular rubber and the polymerization conditions), and the composition of the grafted monomer component "M" (which determines in part the over-all or average composition of the resinous portion of the final gum plastic mixture). Thus if "M" is high in styrene, less grafted monomer can be tolerated without causing opacity in the gum plastic.

The monomer, together with catalyst, regulator if desired, and water to give a final solids content of 35–55%, are added to the rubber latex, and polymerization is carried out preferably to substantially complete (90–100%) conversion of the monomer. The formula used in preparing the graft copolymers used in the examples given below is as follows:

FORMULA B

| | |
|---|---|
| Rubber "E" solids (as latex, Fromula A) | 100 |
| Monomer Component "M" | 33 or 100 |
| Potassium persulfate | 0.5 |
| MTM–4 | 0.5 |
| Water (total) | 300 |

Polymerization time 3–7 hours.
Conversion 90–100%.

As stated above, the monomer component "M" may be MMA, styrene, or a mixture of these two monomers in any proportions.

It should be understood that the above formula is by way of example only, and that the invention is not limited to the use of this particular formula. Thus the rubber latex may be any of those described as suitable in the preceding section I of this application; the kinds and amounts of catalyst, regulator, etc. may be varied in ways well known in the art; and emulsifier may be added before, during, or after the graft polymerization if needed to stabilize the latex. However, any such addition of emulsifier should be limited so that few, if any new polymer particles are formed during the graft polymerization, since this is unfavorable to the grafting reaction.

III. THE RESINOUS COMPONENT

The resin, herein denoted by the letter "R," consists of polymethyl methacrylate or a copolymer of methyl methacrylate with styrene containing at least 40% of MMA. The resin may be made of any of the usual methods for free radical polymerization, including the emulsion, bulk, and bead or suspension methods. If the resin is made as a latex or emulsion, the latex may be mixed as such with a latex of the graft copolymer to give the gum plastic mixture, or the dry solids from the resin latex and the graft copolymer latex may be mixed on a mill or the like. (These alternative methods of mixing are more fully discussed in section IV below).

The proportion of methyl methacrylate in the resin "R" is an important factor in determining the transparency of the gum plastic mixtures of this invention, as is shown in the examples. While high impact strength and other desirable physical properties may be obtained over the whole range of resin compositions from 0% to 100% styrene, high transparency (i.e. light transmission of 50% or more) is found only in mixtures made with resins containing at least about 40% of MMA. It would be difficult and laborious to determine the exact numerical limit of the styrene content which is permissible, especially since this limit may be different for different graft copolymers. However, it is clear from the examples that such a limit exists for each graft copolymer. My invention comprises only such mixtures as have high transparency, i.e. those made with resins having a lower styrene content than that which causes opacity in the gum plastic.

The resins used in the examples given below were made by emulsion polymerization using the following formula:

FORMULA C

| | |
|---|---|
| Monomer | 100 |
| Soap | 5 |
| Potassium persulfate | 0.5 |
| MTM–4 | 0.05 |
| Water | 180 |

Polymerization time—approximately 5 hours to give 95–100% conversion.

IV. MIXING OF GRAFT AND RESIN

If the graft "G" and the resin "R" are available as latices, a preliminary mixing may be accomplished by mixing the two latices, and recovering the dried solids from the mixture by known methods. The mixed solids are then milled or masticated at a temperature and for a time sufficient to plasticize and thoroughly blend the mixture; 5–10 minutes at a temperature of 310° F. is usually sufficient. Alternatively, "G" and "R" may be obtained separately as dry solids, and then blended by mastication. Latex blending is usually preferred, as it gives a uniform and intimate blend with a shorter time of exposure of the material to elevated temperatures.

The proportions of the graft "G" and the resin "R" used in the gum plastic mixture determine the properties of the mixture; and in fact the significant variable is found to be the proportion of the elastomer "E," added as part of the graft "G." With a given graft copolymer and a given resin, increasing the proportion of "G" (and so of "E") progressively reduces the hardness and the elastic modulus, and increases the impact strength. The proportion of "E" required in any given case will depend on the purpose for which the product is to be used and the desired balance of properties, as well as upon the particular graft polymer and resin used. For gum plastics which combine high impact strength (Izod test 3 pounds per inch or higher) with considerable hardness (Rockwell R value 60–90) and stiffness (torsional modulus 150,000–250,000 pounds per square inch), the proportion of "E," based on the total of "G" plus "R," is usually found to lie between 20% and 35%. In cases where hardness and/or stiffness are the paramount consideration, and a lower impact strength is tolerable, the proportion of "E" may be lower than 20% (e.g., 15%). In other cases, proportions of "E" greater than 35% may be found desirable (for example, to give a softer, more pliable product).

The products of the invention in the illustrative examples given below were characterized by measurements of the following properties.

Impact strength was measured by the Izod method using a notched test piece (ASTM method D256–57T), and is expressed as foot-pounds per inch of notch. Measurements were made at 25° C. and at −29° C.

Hardness was measured by the Rockwell test, using the "R" scale (ASTM method D758–51).

Modulus (p.s.i.) was measured by the torsional method of Clash and Berg (Ind. Eng. Chem. 34, 1281 (1942)).

Percent light transmission was measured as the percentage of incident light of wavelength avout 7000 Angstrom units transmitted through a layer of material 1/16 inch thick.

The compositions of the rubber components "E" (made using Formula A above) and of the resin components "R" (made using Formula C above), which were used in making the gum plastics of the illustrative examples, are shown in Table A and Table B respectively. Gum plastics made with resins $R_6$ and $R_7$ having less than 40% of polymerized methyl methyacrylate, are outside of the scope of my invention, since they are opaque.

plastic; the second line gives the resin used; the third line gives the percentage of rubber $E_1$ in the final mixture; the fourth line gives the ratio of monomer component "M" to rubber $E_1$ used in preparing the graft; and the fifth line gives the percentage of methyl methacrylate in "M" (the balance, if any, being styrene). The remaining lines in the table give the properties of the mixtures.

TABLE 1.—GUM PLASTICS BASED ON RUBBER $E_1$ (POLYBUTADIENE)

| Example No | 1-1 | 1-2 | 1-3 | 1-4 | 1-5 | 1-6 | 1-7 | 1-8 | 1-9 | 1-10 |
|---|---|---|---|---|---|---|---|---|---|---|
| Resin (Table B) | $R_1$ | $R_1$ | $R_1$ | $R_2$ | $R_2$ | $R_2$ | $R_2$ | $R_2$ | $R_2$ | $R_2$ |
| Percent $E_1$ in Mixture | 20 | 20 | 20 | 20 | 20 | 20 | 20 | 25 | 25 | 25 |
| Weight "M"/100 $E_1$ | 33 | 100 | 100 | 100 | 100 | 100 | 33 | 33 | 100 | 33 |
| Percent MMA in "M" | 100 | 100 | 67 | 67 | 33 | 0 | 100 | 67 | 67 | 33 |
| Properties: | | | | | | | | | | |
| Impact at 25° C | 1.8 | 0.7 | 2.1 | 2.6 | 2.9 | 2.0 | 6.8 | 3.3 | 6.7 | 2.9 |
| Impact at −29° C | 0.5 | 0.3 | 0.4 | 1.1 | 0.3 | 0.2 | 3.8 | 0.3 | 3.3 | 0.2 |
| Rockwell "R" | 105 | 111 | 103 | 90 | 87 | 85 | 78 | 74 | 77 | 73 |
| Percent Light Trans | 69 | 82 | 62 | 68 | 69 | 70 | 62 | 68 | 68 | 66 |

| Example No | 1-11 | 1-4 | 1-12 | 1-13 | 1-14[1] | 1-15 | 1-16 |
|---|---|---|---|---|---|---|---|
| Resin (Table B) | $R_2$ | $R_2$ | $R_3$ | $R_4$ | $R_2$ | $R_2$ | $R_2$ |
| Percent $E_1$ in Mixture | 20 | 20 | 20 | 20 | 20 | 20 | 20 |
| Weight "M"/100 $E_1$ | 33 | 100 | 100 | 100 | 0 | 10 | 20 |
| Percent MMA in "M" | 67 | 67 | 67 | 67 | ------ | 67 | 67 |
| Properties: | | | | | | | |
| Impact at 25° C | 3.8 | 2.6 | 0.9 | 0.9 | 0.8 | 2.8 | 3.9 |
| Rockwell "R" | 94 | 90 | 100 | 98 | 92 | 94 | 88 |
| Tors. Mod. ×10⁻³ | 250 | 290 | 270 | 250 | 280 | 270 | 520 |
| Percent Light Trans | 67 | 68 | 67 | 52 | 40 | 65 | 65 |

[1] Example 1-14, using ungrafted rubber, is outside of the scope of the invention.

TABLE A.—COMPOSITIONS OF RUBBERS

| Rubber Code | Comonomer | Percent Comonomer | Percent Butadiene |
|---|---|---|---|
| $E_1$ | None | -- | 100 |
| $E_2$ | Styrene | 15 | 85 |
| $E_3$ | ----do---- | 30 | 70 |
| $E_4$ | Methyl Methacrylate | 15 | 85 |
| $E_5$ | ----do---- | 30 | 70 |
| $E_6$ | Alpha-methylstyrene | 15 | 85 |
| $E_7$ | ----do---- | 30 | 70 |
| $E_8$ | Acrylonitrile | 15 | 85 |
| $E_9$ | ----do---- | 30 | 70 |

TABLE B.—COMPOSITIONS OF RESINS

| Resin Code | Percent Methyl Methacrylate | Percent Styrene |
|---|---|---|
| $R_1$ | 100 | 0 |
| $R_2$ | 67 | 33 |
| $R_3$ | 60 | 40 |
| $R_4$ | 50 | 50 |
| $R_5$ | 40 | 60 |
| $R_6$* | 33 | 67 |
| $R_7$* | 0 | 100 |

*Gum plastics made with these resins are outside the scope of the invention.

*Example 1*

Graft copolymers were made on rubber $E_1$, (polybutadiene) in latex form, using monomer components "M" containing methyl methacrylate and styrene in various proportions, and grafting various amounts of "M" per 100 of $E_1$. These graft copolymers were mixed with the resins of Table B to give gum plastic compositions, which were molded and tested. Table 1 shows the composition and results of tests for a number of these gum plastics. In the table, the first line identifies the gum These results shown that transparent gum plastics are obtainable using resins containing from 50% MMA (Example 1-13) to 100% MMA (Examples 1-1 to 1-3). Similar mixtures made with resins $R_5$, $R_6$, and $R_7$ containing less than 50% MMA, while in some cases showing good impact strength, in no case showed as much as 50% light transmission.

Transparent gum plastics are obtainable using graft copolymers made with 100% styrene monomer (Example 1-6), with 100% MMA monomer, and with mixtures of styrene and MMA monomers. The weight ratio of "M" to rubber in the graft may be as low as 1 to 10 (Example 1-15); when ungrafted rubber is used, however, the light transmission is low (see Example 1-14, which is outside of the scope of the invention).

Examples are shown with 20 and 25 parts of rubber per 100 of total composition. It is evident that increasing the rubber content raises the impact strength and lowers the hardness (Rockwell "R"), without any large effect on the light transmission (compare e.g. Example 1-8 with 1-11, and 1-9 with 1-4). Rubber percentages under 20 or over 25 may be used to give gum plastics which are respectively harder and stiffer, or softer, more flexible, and tougher, than those shown in the Examples, according to the needs in a particular application. In the case of the rubber $E_1$, gum plastics with less than 20% rubber are usually too brittle to be useful, while those with more than 30% rubber are too soft and flexible for many purposes.

*Example 2*

A number of gum plastic mixtures based on rubber $E_2$ (85 butadiene/15 styrene copolymer) were made as described in Example 1. Table 2 gives the compositions and properties of some of these mixtures.

TABLE 2.—GUM PLASTICS BASED ON RUBBER $E_2$ (85 BUTADIENE/15 STYRENE)

| Example No | 2-1 | 2-2 | 2-3 | 2-4 | 2-5 | 2-6 | 2-7 | 2-8 | 2-9 |
|---|---|---|---|---|---|---|---|---|---|
| Resin (Table B) | $R_1$ | $R_1$ | $R_2$ | $R_2$ | $R_2$ | $R_2$ | $R_2$ | $R_2$ | $R_2$ |
| Percent $E_2$ in Mixture | 25 | 25 | 25 | 25 | 25 | 25 | 25 | 25 | 25 |
| Weight "M"/100 $E_2$ | 33 | 100 | 33 | 100 | 33 | 100 | 33 | 100 | 33 |
| Percent MMA in "M" | 100 | 100 | 100 | 100 | 67 | 67 | 33 | 33 | 0 |
| Properties: | | | | | | | | | |
| Impact at 25° C | 1.6 | 0.9 | 1.1 | 1.0 | 5.6 | 2.8 | 4.2 | 5.4 | 0.9 |
| Impact at −29° C | 0.3 | 0.3 | 0.4 | 0.4 | 0.4 | 0.9 | 1.1 | 2.1 | 0.3 |
| Rockwell "R" | 98 | 106 | 95 | 103 | 86 | 91 | 79 | 72 | 73 |
| Percent Light Trans | 67 | 71 | 84 | 68 | 83 | 80 | 73 | 63 | 53 |

| Example No | 2-10 | 2-11 | 2-12 | 2-13 | 2-14 | 2-15 |
|---|---|---|---|---|---|---|
| Resin (Table B) | $R_2$ | $R_2$ | $R_2$ | $R_2$ | $R_2$ | $R_2$ |
| Percent $E_2$ in Mixture | 30 | 30 | 30 | 30 | 30 | 30 |
| Weight "M"/100 $E_2$ | 33 | 100 | 33 | 100 | 33 | 100 |
| Percent MMA in "M" | 100 | 100 | 67 | 67 | 33 | 33 |
| Properties: | | | | | | |
| Impact at 25° C | 3.1 | 1.0 | 6.2 | 4.6 | 3.5 | 6.1 |
| Impact at −29° C | 0.5 | 0.4 | 0.6 | 1.2 | 1.0 | 3.0 |
| Rockwell "R" | 80 | 96 | 59 | 71 | 57 | 56 |
| Percent Light Trans | 80 | 77 | 81 | 80 | 76 | 63 |

| Example No | 2-5 | 2-6 | 2-16 | 2-17 | 2-18 | 2-19 | 2-20[1] | 2-21 | 2-22 |
|---|---|---|---|---|---|---|---|---|---|
| Resin (Table B) | $R_2$ | $R_2$ | $R_3$ | $R_3$ | $R_4$ | $R_5$ | $R_2$ | $R_2$ | $R_2$ |
| Percent $E_2$ in Mixture | 25 | 25 | 25 | 25 | 25 | 25 | 25 | 25 | 25 |
| Weight "M"/100 $E_2$ | 33 | 100 | 22 | 100 | 100 | 100 | 0 | 10 | 20 |
| Percent MMA in "M" | 67 | 67 | 67 | 67 | 67 | 67 | | 67 | 67 |
| Properties: | | | | | | | | | |
| Impact at 25° C | 5.6 | 2.8 | 8.6 | 0.7 | 0.6 | 0.8 | 0.7 | 3.2 | 6.1 |
| Rockwell "R" | 86 | 91 | 76 | 98 | 96 | 95 | 69 | 79 | 79 |
| Percent Light Trans | 83 | 80 | 70 | 80 | 69 | 53 | 64 | 77 | 80 |

[1] Example 2-20, using ungrafted rubber, is outside of the scope of the invention.

Transparent gum plastics were obtained using resins containing from 100% MMA ($R_1$) to 40% MMA ($R_5$, Example 2-19). Resins $R_6$ and $R_7$ containing less than 40% MMA, failed to give transparent gum plastics.

In this case, as in Example 1, transparent gum plastics are obtainable using grafted monomer compositions of from 100% MMA (e.g. Example 2-10 and others) to 100% styrene (Example 2-9); also the amount of grafted polymer may be as little as 10 parts per 100 rubber (Example 2-21); using ungrafted rubber (Example 2-20, which is outside of the scope of the invention), a fair light transmission of 64% was obtained, but the relatively low impact strength of 0.7 at a Rockwell "R" hardness of only 69 make this mixture decidedly inferior as a gum plastic.

Examples are shown with 25 and 30 parts of rubber per 100 of total composition. In the case of rubber $E_2$, the useful range of this variable is usually from 25% to 35% rubber, with however the possibility that compositions outside this range may be found useful for particular purposes.

*Example 3*

Gum plastic mixtures based on rubber $E_3$ (70 butadiene/30 styrene) were made as described in Example 1. Table 3 gives the composition and properties of some of these mixtures.

TABLE 3.—GUM PLASTICS BASED ON RUBBER $E_3$ (70 BUTADIENE/30 STYRENE)

| Example No | 3-1 | 3-2 | 3-3 | 3-4 |
|---|---|---|---|---|
| Resin (Table B) | $R_2$ | $R_2$ | $R_2$ | $R_2$ |
| Percent $E_3$ in Mixture | 30 | 30 | 30 | 30 |
| Weight "M"/100 $E_3$ | 33 | 100 | 33 | 100 |
| Percent MMA in "M" | 100 | 100 | 67 | 67 |
| Properties: | | | | |
| Impact at 25° C | 1.8 | 0.7 | 6.7 | 4.2 |
| Impact at −29° C | 0.3 | 0.3 | 0.3 | 0.3 |
| Rockwell "R" | 83 | 99 | 68 | 77 |
| Percent Light Trans | 86 | 85 | 73 | 86 |

Mixtures made with resins $R_1$, $R_6$, and $R_7$, and mixtures made with resin $R_2$ and grafts in which the grafted monomer "M" contained 33% or 0% of MMA, showed less than 50% light transmission. Rubber $E_3$ is more limited than rubbers $E_1$ and $E_2$ as regards the ranges of the variables which give transparent gum plastics; however, this rubber is useful in a limited region within the ranges of the variables for the other rubbers.

*Example 4*

Data similar to those given in the preceding examples are shown in Table 4 for gum plastics based on rubber $E_4$ (85 butadiene/15 MMA).

TABLE 4.—GUM PLASTICS BASED ON RUBBER $E_4$ (85 BUTADIENE/15 MMA)

| Example No | 4-1 | 4-2 | 4-3 | 4-4 | 4-5 | 4-6 | 4-7 | 4-8 | 4-9 |
|---|---|---|---|---|---|---|---|---|---|
| Resin (Table B) | $R_1$ | $R_1$ | $R_2$ | $R_2$ | $R_2$ | $R_2$ | $R_2$ | $R_2$ | $R_2$ |
| Percent $E_4$ in mixture | 25 | 25 | 25 | 25 | 25 | 25 | 25 | 25 | 25 |
| Weight "M"/100 $E_4$ | 100 | 100 | 33 | 100 | 33 | 100 | 33 | 100 | 33 |
| Percent MMA in "M" | 100 | 67 | 100 | 100 | 67 | 67 | 33 | 33 | 0 |
| Properties: | | | | | | | | | |
| Impact at 25° C | 1.3 | 3.9 | 1.9 | 0.9 | 4.0 | 3.2 | 3.2 | 7.5 | 2.3 |
| Impact at −29° C | 0.4 | 2.0 | 0.4 | 0.4 | 0.4 | 0.7 | 0.5 | 1.9 | 0.5 |
| Rockwell "R" | 106 | 93 | 98 | 105 | 92 | 91 | 90 | 82 | 85 |
| Tors. Mod. ×10$^{-3}$ | 230 | 240 | 260 | 250 | 250 | 240 | 240 | 240 | 230 |
| Percent Light Trans | 66 | 65 | 57 | 60 | 54 | 54 | 52 | 53 | 62 |

These data and other data not given here, show that useful gum plastics are obtainable within the following ranges of the variables:

Resin composition—from 100% at least to 67% MMA (mixtures made with resin $R_6$ (33% MMA) and $R_7$ (0% MMA) were opaque). Rubber content—only mixtures with 25% rubber are shown. The useful range for this rubber is from about 20% to about 30% rubber.

Composition and amount of grafted monomer "M"— the same ranges apply as for Examples 1 ($E_1$) and 2 ($E_2$).

*Examples 5 to 9*

Tables 5 to 9 give data on gum plastic mixtures based on the correspondingly numbered rubbers $E_5$ to $E_9$. These data need not be discussed in detail; they show that useful transparent gum plastics are obtainable using all of these rubbers, within the ranges of the compositional variables found to hold for rubbers $E_1$ and $E_2$.

TABLE 5.—GUM PLASTICS BASED ON RUBBER $E_5$ (70 BUTADIENE/30 MMA)

| Example No | 5-1 | 5-2 | 5-3 | 5-4 | 5-5 | 5-6 | 5-7 | 5-8 | 5-9 |
|---|---|---|---|---|---|---|---|---|---|
| Resin (Table B) | $R_1$ | $R_1$ | $R_1$ | $R_1$ | $R_2$ | $R_2$ | $R_2$ | $R_2$ | $R_2$ |
| Percent $E_5$ in mixture | 30 | 30 | 30 | 30 | 30 | 30 | 30 | 30 | 30 |
| Weight "M"/100 $E_5$ | 33 | 33 | 100 | 33 | 33 | 100 | 33 | 100 | 100 |
| Percent MMA in "M" | 100 | 67 | 67 | 33 | 100 | 100 | 67 | 67 | 33 |
| Properties: | | | | | | | | | |
| Impact at 25° C | 2.8 | 5.1 | 4.5 | 3.0 | 6.0 | 0.9 | 9.8 | 8.2 | 10.0 |
| Impact at −29° C | 1.0 | 2.0 | 1.5 | 1.2 | 1.0 | 0.4 | 0.4 | 0.8 | 0.8 |
| Rockwell "R" | 86 | 74 | 83 | 71 | 80 | 100 | 68 | 75 | 66 |
| Tors. Mod. ×10⁻³ | 160 | 160 | 180 | 160 | 210 | 210 | 200 | 200 | 180 |
| Percent Light Trans | 71 | 62 | 71 | 50 | 67 | 67 | 56 | 71 | 50 |

TABLE 6.—GUM PLASTICS BASED ON RUBBER $E_6$ (85 BUTADIENE/15 ALPHA-METHYL-STYRENE)

| Example No | 6-1 | 6-2 | 6-3 | 6-4 | 6-5 | 6-6 | 6-7 |
|---|---|---|---|---|---|---|---|
| Resin (Table B) | $R_1$ | $R_2$ | $R_2$ | $R_2$ | $R_2$ | $R_2$ | $R_2$ |
| Percent $E_6$ in mixture | 25 | 25 | 25 | 25 | 25 | 25 | 25 |
| Weight "M"/100 $E_6$ | 33 | 33 | 100 | 33 | 100 | 33 | 100 |
| Percent MMA in "M" | 100 | 100 | 100 | 67 | 67 | 33 | 33 |
| Properties: | | | | | | | |
| Impact at 25° C | 1.1 | 2.1 | 0.7 | 5.5 | 2.5 | 3.8 | 5.3 |
| Impact at −29° C | 0.2 | 0.3 | 0.4 | 0.2 | 0.4 | 0.9 | 0.7 |
| Rockwell "R" | 104 | 93 | 103 | 79 | 87 | 80 | 78 |
| Tors. Mod. ×10⁻³ | 200 | 230 | 250 | 230 | 230 | 210 | 210 |
| Percent Light Trans | 60 | 81 | 81 | 86 | 85 | 81 | 60 |

TABLE 7.—GUM PLASTICS BASED ON RUBBER $E_7$ (70 BUTADIENE/30 ALPHA-METHYL-STYRENE)

| Example No | 7-1 | 7-2 | 7-3 | 7-4 | 7-5 | 7-6 |
|---|---|---|---|---|---|---|
| Resin (Table B) | $R_1$ | $R_2$ | $R_2$ | $R_2$ | $R_2$ | $R_3$ |
| Percent $E_7$ in mixture | 30 | 30 | 30 | 30 | 30 | 30 |
| Weight "M"/100 $E_7$ | 33 | 33 | 100 | 33 | 100 | 100 |
| Percent MMA in "M" | 100 | 100 | 100 | 67 | 67 | 67 |
| Properties: | | | | | | |
| Impact at 25° C | 2.2 | 6.6 | 1.0 | 7.4 | 6.1 | 2.6 |
| Impact at −29° C | 0.2 | 0.3 | 0.3 | 0.2 | 0.3 | 0.3 |
| Rockwell "R" | 90 | 83 | 101 | 78 | 84 | 74 |
| Tors. Mod. ×10⁻³ | 170 | 200 | 210 | 200 | 190 | 170 |
| Percent Light Trans | 50 | 77 | 70 | 60 | 75 | 50 |

TABLE 8.—GUM PLASTICS BASED ON RUBBER $E_8$ (85 BUTADIENE/15 ACRYLONITRILE)

| Example No | 8-1 | 8-2 | 8-3 | 8-4 | 8-5 | 8-6 | 8-7 | 8-8 | 8-9 | 8-10 | 8-11 |
|---|---|---|---|---|---|---|---|---|---|---|---|
| Resin (Table B) | $R_1$ | $R_1$ | $R_1$ | $R_1$ | $R_2$ | $R_2$ | $R_2$ | $R_2$ | $R_2$ | $R_2$ | $R_2$ |
| Percent $E_8$ in Mixture | 30 | 30 | 30 | 30 | 30 | 30 | 30 | 30 | 30 | 30 | 30 |
| Weight "M"/100 $E_8$ | 33 | 100 | 33 | 100 | 33 | 100 | 33 | 100 | 33 | 100 | 33 |
| Percent MMA in "M" | 100 | 100 | 67 | 67 | 100 | 100 | 67 | 67 | 33 | 33 | 0 |
| Properties: | | | | | | | | | | | |
| Impact at 25° C | 1.7 | 0.8 | 3.1 | 1.2 | 0.9 | 0.7 | 4.8 | 0.7 | 4.6 | 1.2 | 4.1 |
| Impact at −29° C | 1.0 | 0.5 | 2.0 | 0.8 | 0.7 | 0.5 | 1.8 | 0.6 | 2.8 | 0.7 | 2.3 |
| Rockwell "R" | 91 | 103 | 80 | 90 | 91 | 105 | 78 | 92 | 73 | 77 | 65 |
| Tors. Mod. ×10⁻³ | 170 | 200 | 140 | 180 | 200 | 200 | 180 | 190 | 170 | 180 | 160 |
| Percent Light Trans | 71 | 80 | 50 | 79 | 74 | 83 | 69 | 83 | 78 | 81 | 81 |

TABLE 9.—GUM PLASTICS BASED ON RUBBER $E_9$ (70 BUTADIENE/30 ACRYLONTRILE)

| Example No | 9-1 | 9-2 | 9-3 | 9-4 | 9-5 | 9-6 | 9-7 |
|---|---|---|---|---|---|---|---|
| Res. (Table B) | $R_1$ | $R_1$ | $R_1$ | $R_1$ | $R_1$ | $R_1$ | $R_1$ |
| Percent $E_9$ in mixture | 30 | 30 | 30 | 30 | 25 | 25 | 25 |
| Weight "M"/100 $E_9$ | 33 | 100 | 33 | 100 | 33 | 100 | 100 |
| Percent MMA in "M" | 100 | 100 | 67 | 67 | 100 | 100 | 67 |
| Properties: | | | | | | | |
| Impact at 25° C | 0.9 | 0.6 | 1.9 | 0.8 | 1.0 | 0.5 | 0.7 |
| Impact at −29° C | 0.3 | 0.3 | 0.2 | 0.3 | .3 | 0.3 | 0.3 |
| Rockwell "R" | 99 | 107 | 93 | 97 | 106 | 112 | 105 |
| Tors. Mod. ×$10^{-3}$ | 190 | 200 | 190 | 190 | 230 | 240 | 240 |
| Percent Light Trans | 71 | 70 | 50 | 71 | 60 | 79 | 68 |

| Example No | 9-8 | 9-9 | 9-10 | 9-11 | 9-12 | 9-13 | 9-14 |
|---|---|---|---|---|---|---|---|
| Res. (Table B) | $R_2$ | $R_2$ | $R_2$ | $R_2$ | $R_2$ | $R_2$ | $R_2$ |
| Percent $E_9$ in Mixture | 25 | 25 | 25 | 25 | 25 | 25 | 25 |
| Weight "M"/100 $E_9$ | 33 | 100 | 33 | 100 | 33 | 100 | 33 |
| Percent MMA in "M" | 100 | 100 | 67 | 67 | 33 | 33 | 0 |
| Properties: | | | | | | | |
| Impact at 25° C | 0.6 | 0.4 | 3.6 | 0.4 | 3.6 | 0.7 | 1.5 |
| Impact at −29° C | 0.2 | 0.4 | 0.3 | 0.4 | 0.2 | 0.2 | 0.3 |
| Rockwell "R" | 103 | 111 | 95 | 103 | 91 | 93 | 93 |
| Tors. Mod. ×$10^{-3}$ | 240 | 270 | 210 | 230 | 240 | 240 | 230 |
| Percent Light Trans | 72 | 79 | 52 | 81 | 50 | 75 | 68 |

The compositions of my invention are hard, tough mixtures, characterized by the transmission of at least 50% of the incident radiation of about 7000 Angstrom units wavelength through a layer one-sixteenth inch thick, comprising a graft copolymer component "G" and a resinous component "R," in which the resinous component "R" is selected from the group consisting of polymethyl methacrylate and copolymers of methyl methacrylate and styrene containing at least 40% of methyl methacrylate, and in which the graft copolymer "G" is the product of the polymerization of a monomeric component "M" selected from the group consisting of styrene, methyl methacrylate, and blends of styrene and methyl methacrylate in a latex of an elastomer "E" selected from the group consisting of polybutadiene and rubbery copolymers of butadiene with a mono-olefinic monomer containing up to 40% of said mono-olefinic monomer; the ratio by weight of said monomeric component "M" to said elastomer "E" being at least 0.1 to 1; and the relative amounts of "G" and "R" in said mixture being such that the elastomer "E" comprises from 15% to 35% of said mixture.

Preferred compositions are those in which "E" is a copolymer of about 80 to 90% (most preferably about 85%) of butadiene with correspondingly about 20 to 10% (most preferably about 15%) of styrene or alpha-methylstyrene (most preferably styrene); "R" is a copolymer of about 60 to 70% (most preferably about 67%) of methyl methacrylate with correspondingly from about 40 to 30% (most preferably about 33%) of styrene of alpha-methylstyrene (most preferably styrene); "M" is a blend of about 60 to 70% (most preferably about 67%) of methyl methacrylate with correspondingly about 40 to 30% (most preferably about 33%) of styrene, and "E" comprises about 25 to 30% of the mixture.

Having thus described my invention, what I claim desire to protect by Letters Patent is:

1. A composition which is a hard, tough mixture, characterized by the transmission of at least 50% of the incident radiation of about 7000 Angstrom units wave length through a layer one-sixteenth inch thick, comprising a graft polymer component "G" and a resinous component "R", in which the resinous component "R" is selected from the group consisting of polymethyl methacrylate and copolymers of methyl methacrylate and styrene containing at least 40% of methyl methacrylate, and in which the graft copolymer "G" is the product of the polymerization of a monomeric component "M" selected from the group consisting of styrene, methyl methacrylate, and blends of styrene and methyl methacrylate in a latex of an elastomer "E" selected from the group consisting of polybutadiene and rubbery copolymers of butadiene with a mono-olefinic monomer containing up to 40% by weight of said mono-olefinic monomer; the ratio by weight of said monomeric component "M" to said elastomer "E" being within the range of from 0.1:1 to 2:1 by weight; and the relative amounts of "G" and "R" in said mixture being such that the elastomer "E" comprises from 15% to 35% by weight of said mixture.

2. A composition as in claim 1, in which "E" is polybutadiene.

3. A composition as in claim 1, in which "E" is a copolymer of butadiene with a mono-olefinic monomer containing up to 40% by weight of said mono-olefinic monomer.

4. A composition as in claim 3, in which said mono-olefinic monomer is styrene.

5. A composition as in claim 3, in which said mono-olefinic monomer is methyl methacrylate.

6. A composition as in claim 3, in which said mono-olefinic monomer is alpha-methylstyrene.

7. A composition as in claim 3, in which said mono-olefinic monomer is acrylonitrile.

8. A composition as in claim 1, in which "R" is polymethyl methacrylate.

9. A composition as in claim 1, in which "R" is a copolymer of methyl methacrylate and styrene containing at least 40% by weight of methyl methacrylate.

10. A composition as in claim 1, in which "M" is styrene.

11. A composition as in claim 1, in which "M" is methyl methacrylate.

12. A composition as in claim 1, in which "M" is a mixture of styrene and methyl methacrylate.

13. A composition as in claim 1, in which "E" is a copolymer of from 80 to 90% of butadiene with correspondingly from 20 to 10% of styrene, "R" is a copolymer of from 60 to 70% of methyl methacrylate with correspondingly from 40 to 30% of styrene; "M" is a blend of from 60 to 70% if methyl methacrylate with correspondingly from 40 to 30% of styrene, and "E" comprises from 25 to 30% of said mixture, all the said percentages of ingredients being by weight.

14. A composition as in claim 1, in which "E" is a copolymer of 85% of butadiene with 15% of styrene, "R" is a copolymer of 67% of methyl methacrylate with 33% of styrene, "M" is a blend of 67% of methyl methacrylate and 33% of styrene, and "E" comprises from 25 to 30% of said mixture, all the said percentages of ingredients being by weight.

15. A composition obtained by polymerizing 50 parts by weight of a polymerizable material consisting of methyl methacrylate while in intimate contact with 50 parts by weight of a butadiene homopolymer.

16. A composition obtained by polymerizing 50 parts by weight of a polymerizable mixture consisting of methyl methacrylate and styrene while in intimate contact with 50 parts by weight of a butadiene homopolymer, said polymerizable mixture containing at least 50% by weight of methyl methacrylate.

17. A composition obtained by polymerizing a polymerizable mixture consisting of 33 to 100 parts by weight of a polymerizable material consisting of methyl methacrylate while in intimate contact with 100 parts by weight of a butadiene homopolymer.

18. A composition obtained by polymerizing 33 to 100 parts by weight of a polymerizable mixture consisting of methyl methacrylate and styrene while in intimate contact with 100 parts by weight of a butadiene homopolymer, said polymerizable mixture containing at least 50% by weight of methyl methacrylate.

References Cited by the Examiner

UNITED STATES PATENTS

| 2,419,202 | 4/1947 | D'Alelio | 260—876 |
| 2,857,360 | 10/1958 | Feuer | 260—880 |

FOREIGN PATENTS

| 679,562 | 9/1952 | Great Britain. |
| 749,494 | 5/1956 | Great Britain. |
| 888,775 | 9/1943 | France. |

OTHER REFERENCES

J. of Polymer Science, vol. 8, No. 3 (1952), p. 260.

Whitby: Ind. Eng. Chem., 47, pp. 806–820, esp. 815–817 (April 1955).

Modern Plastics Encyclopedia, September 1955, pp. 53 and 54.

MURRAY TILLMAN, *Primary Examiner.*

LESLIE H. GASTON, DANIEL ARNOLD, *Examiners.*

R. N. COE, D. E. PELHAM, G. F. LESMES,
*Assistant Examiners.*